J. Jackman, Jr.,
Steam Cut-Off.
N° 47,359. Patented Apr. 18, 1865.

Witnesses:
Henry W. Moulton.
Harrison G. Johnson.

Inventor:
John Jackman Jr

UNITED STATES PATENT OFFICE.

JOHN JACKMAN, JR., OF NEWBURYPORT, MASSACHUSETTS, ASSIGNOR TO THE AMERICAN AUTOMATIC STOP MOTION COMPANY, OF SAME PLACE.

IMPROVEMENT IN AUTOMATIC STOP-MOTIONS FOR STEAM-ENGINES.

Specification forming part of Letters Patent No. 47,359, dated April 18, 1865.

DIVISION D.

*To all whom it may concern:*

Be it known that I, JOHN JACKMAN, Jr., of Newburyport, in the county of Essex and State of Massachusetts, have invented a new and Improved Automatic Stop-Motion for Engines, &c.; and I do hereby declare that the following is full, clear, and exact description thereof, which will enable those skilled in the art to make and use the same, reference being had to the accompanying drawings, forming part of this specification, in which—

Figure 2:
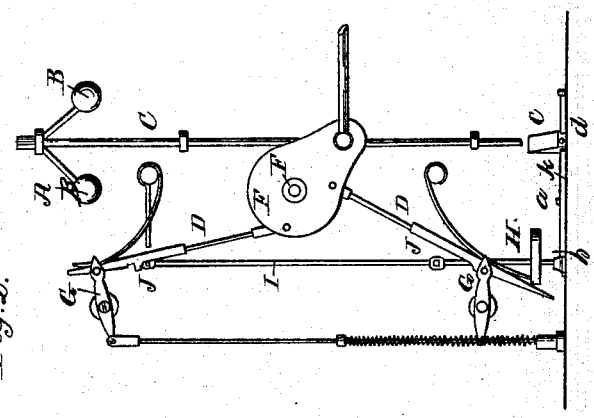
Figure 3:
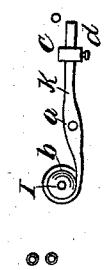
Figure 1:
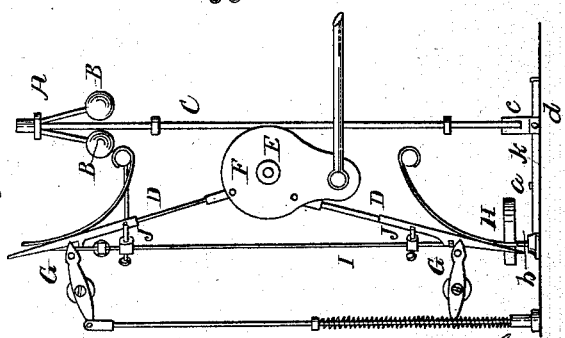

Figure 1 represents a front elevation of this invention when the balls of the governor are down and the engine stops. Fig. 2 is a similar elevation, when the engine is running at its regular speed and the balls assume their mean position. Fig. 3 is a plan of the stop and inclined plane.

Similar letters of reference indicate corresponding parts.

This invention consists in a spring and suitable stop applied in combination with the governor-shaft, and with arms mounted on a bar, which can turn in its bearings, and which, when it turns, causes said arms to come in contact with the catch-bars and to liberate the same from the pins of the levers, shoes, or other equivalent parts, acting on the valve in such a manner that when the arms are turned to such a position in which they do not interfere with the action of the catch-bars, the spring is wound up on the rod and retained in this position by the stop, and the engine is allowed to run in its regular manner; but if from some cause the governor-ball drop while the engine is running, the shaft of the governor liberates the spring, and the arms are turned, causing them to liberate the catch-bars automatically and to stop the engine. The stop, which is combined with the spring, consists of a straight or bent lever, carrying a cam, with an incline, and made to catch into a notch in the circumference of a disk, which is mounted on the bar carrying the arms in such a manner that when the governor-balls drop, and the shaft of the same comes in contact with said incline, the spring is liberated and the engine stops.

A represents a governor, the balls B of which are connected to the shaft C in such a manner that when the balls fly out said shaft is raised, and when the balls drop the shaft descends. The catch-bars D D are hinged to a disk, E, which is mounted on a rock-shaft, F, and by the action of the catch-bars on the levers G the cut-off valve or valves are opened at every stroke of the piston.

In order to trip off the hooks or catch-bars automatically, I employ a spring, H, which is connected to a rod, I, and said rod is so arranged that it can turn in its bearings. Mounted on the same are arms J, and if the rod is turned to such a position that these arms do not come in contact with the hooks or catch-bars, the spring is strained or wound up, and if the rod is allowed to follow the action of the spring the arms come in contact with the catch-bars and trip the same off. A lever, K, which has its fulcrum on a pivot, *a*, and which catches into a notch in a disk, *b*, mounted on the rod I, retains the same against the action of the spring. Said lever carries a cam, *c*, with an inclined face, and made adjustable by means of a set-screw, *d*. When this cam is brought opposite the end of the governor-shaft, and the balls drop down, said shaft strikes the inclined face of the cam and liberates the lever from the notched disk. The rod I is then allowed to follow the action of the spring H, and the engine stops. The cam *c* is adjusted in position as soon as the engine has assumed its regular speed, bringing the balls of the governor up to their mean position, as shown in Fig. 2 of the drawings. If from some cause the balls drop down while the engine is running the shaft of the governor strikes the inclined face of the cam, and the engine stops automatically. It will be readily understood that the cam can be easily so arranged that it will not interfere with the usual range of the governor, and that the spring will not be liberated until the balls of the governor sink down to their lowest position.

It is obvious that the arms J, instead of acting on the catch-bars D D, may be made to act on a corresponding part of any other cut-off or throttle-valve, and I wish to reserve the right to apply this invention to valves of any description.

I claim as new and desire to secure by Letters Patent—

1. The spring H, applied in combination with the rod I, arms J, catch-bars D D, or their equivalents, governor A, and with a suitable stop, substantially as and for the purpose set forth.

2. The adjustable cam $c$ with an inclined plane, in combination with the lever K, notched disk $b$, spring H, rod I, with arms J, and with the governor and catch-bars, or their equivalents, constructed and operating substantially as and for the purpose described.

JOHN JACKMAN, Jr.

Witnesses:
 HENRY W. MOULTON,
 HARRISON G. JOHNSON.